United States Patent
Mader

(10) Patent No.: US 10,633,171 B2
(45) Date of Patent: Apr. 28, 2020

(54) DEVICE AND METHOD FOR STORING AND/OR FOR TRANSPORTING INSULATING GLASS PANES

(71) Applicant: LISEC AUSTRIA GMBH, Seitenstetten (AT)

(72) Inventor: Leopold Mader, Neuhofen/Ybbs (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 0 days.

(21) Appl. No.: 16/306,792

(22) PCT Filed: Jun. 20, 2017

(86) PCT No.: PCT/EP2017/065129
§ 371 (c)(1),
(2) Date: Dec. 3, 2018

(87) PCT Pub. No.: WO2018/077489
PCT Pub. Date: May 3, 2018

(65) Prior Publication Data
US 2019/0218022 A1    Jul. 18, 2019

(30) Foreign Application Priority Data

Oct. 28, 2016 (AT) .............................. GM50229/2016

(51) Int. Cl.
*A47F 7/00*  (2006.01)
*B65D 85/48* (2006.01)
(Continued)

(52) U.S. Cl.
CPC ............ *B65D 85/48* (2013.01); *A47F 7/0042* (2013.01); *B65D 19/44* (2013.01); *B65G 1/04* (2013.01);
(Continued)

(58) Field of Classification Search
CPC ....... B65D 19/44; B65D 85/48; A47F 7/0042; B65G 49/062
See application file for complete search history.

(56) References Cited

U.S. PATENT DOCUMENTS

| 4,202,452 A | 5/1980 | Mccormick |
| 6,510,950 B1 | 1/2003 | Piazza |

(Continued)

FOREIGN PATENT DOCUMENTS

| DE | 9400411 U1 | 4/1994 |
| DE | 20 2013 010 500 U1 | 12/2013 |

(Continued)

OTHER PUBLICATIONS

International Search Report, dated Aug. 9, 2017, from corresponding PCT application No. PCT/EP2017/065129.

*Primary Examiner* — Kimberley S Wright

(74) *Attorney, Agent, or Firm* — Young & Thompson

(57) ABSTRACT

A device for storing and/or for transporting preferably substantially vertically oriented, panel-shaped objects, in particular insulating glass elements, having support planes and having compartment delimiters which delimit compartments, wherein the support planes delimit a support region. At least parts of compartment delimiters can be moved into an operative position in which parts engage through the support planes and project into the support region, with the result that compartment delimiters form compartments for panel-shaped objects in the support region with their parts which project into the support region. Compartment delimiters can be moved out of the operative position into a standby position in which compartment delimiters are arranged outside of the support region. Compartment delimiters are arranged adjustably on positioning bars and can be fixed in a form- and/or force-fitting manner on positioning bars against adjustment.

19 Claims, 9 Drawing Sheets

(51) Int. Cl.
  *B65D 19/44* (2006.01)
  *B65G 1/04* (2006.01)
(52) U.S. Cl.
  CPC ............... *B65D 2519/0082* (2013.01); *B65D 2519/00338* (2013.01); *B65D 2519/00666* (2013.01); *B65D 2519/00815* (2013.01)

(56) References Cited

U.S. PATENT DOCUMENTS

| | | |
|---|---|---|
| 7,044,066 B1 | 5/2006 | Miller |
| 7,249,682 B2 | 7/2007 | Lacatus |
| 8,025,161 B2 | 9/2011 | Chookang |
| 2004/0131441 A1 | 7/2004 | Kessler |
| 2004/0245195 A1 | 12/2004 | Pride |
| 2006/0014618 A1 | 1/2006 | Farley et al. |
| 2012/0000866 A1 | 1/2012 | Huszczo et al. |

FOREIGN PATENT DOCUMENTS

| | | |
|---|---|---|
| FR | 2242873 A5 | 3/1975 |
| JP | 2004-338740 A | 12/2004 |

# DEVICE AND METHOD FOR STORING AND/OR FOR TRANSPORTING INSULATING GLASS PANES

The invention relates to a device for storing and/or for transporting preferably essentially vertically aligned panel-shaped articles, in particular insulating glass elements, with support planes and with compartment delimiters that delimit compartments, the support planes delimiting a support region.

Furthermore, the invention relates to a method for storing and/or for transporting preferably essentially vertically aligned panel-shaped articles, in particular insulating glass elements, the panel-shaped articles being accommodated in compartments that are formed in a support region of a device.

BACKGROUND OF THE INVENTION

Insulating glass elements comprise at least two glass panes that are parallel to one another, which are held at a distance and are joined to one another by a spacer that runs offset to the inside along the pane edge and that is cemented between the panes, for example an aluminum section or a plastic spacer. The edge joint that is open to the outside, which is bordered to the inside by the spacer and which lies between the glass panes, is sealed with sealant (sealing mass).

Since spacers of different widths are used between the glass panes and insulating glass elements with more than two glass panes can be made according to the above-described principle, there are insulating glass elements not only with different shapes, lengths and widths, but also with different thicknesses.

Due to the differences in size and as a result of the fact that the sealant is sufficiently set only one to two weeks after completion of the insulating glass elements, special demands arise on devices for storing and for transporting insulating glass elements, in particular when the insulating glass elements are to be accommodated in the device protected against the action of external forces and in a manner as space-saving as possible.

A generic device is known from DE 20 2013 010 500 U1. On an L-shaped base frame in support planes, there are several application strips that are provided with wedge-shaped teeth. The teeth that are used as compartment delimiters are tightly joined to the application strip, spaced at a uniform distance from one another along the application strip, and project into the support region, so that the compartment delimiters form compartments for holding panel-shaped articles (such as insulating glass elements). Since the teeth taper away from the application strip, panel-shaped articles of different thickness can be held between the teeth, the panel-shaped articles fitting with outside edges on flanks of the teeth. The disadvantage is that due to the inherent weight of the panel-shaped articles in conjunction with the slope of the flanks of the teeth, a lateral component of force is acting on the panel-shaped articles; this is unfavorable for the case in which the insulating glass elements are newly-completed and can lead to unwanted deformations of the insulating glass elements. Furthermore, there is only ever space in the device for a number of insulating glass elements that is predetermined by size, number and spacing of the teeth.

U.S. Pat. No. 8,025,161 B2 discloses a device for storing and/or for transporting panel-shaped articles. Between rod elements that are joined fixed to a frame system and that project into a receiving region, compartments are formed in which panel-shaped articles aligned standing essentially vertically are accommodated.

U.S. Pat. No. 7,249,682 B2 discloses a device for storing and/or for transporting panel-shaped articles in which the panel-shaped articles are secured standing essentially vertically aligned by clamping elements that act on several locations of the articles and are located on a base frame. The clamping force of the clamping elements is produced by springs assigned to the clamping elements. The clamping elements can be opened at the same time via a mechanism.

U.S. Pat. No. 7,044,066 B1 describes a device for storing and/or for transporting panel-shaped articles with a pallet-shaped base frame and compartment delimiters that are located thereon. The compartment delimiters can be pivoted out of a horizontal into a vertical position, can be moved in the plane of the base frame, and can be secured in a selected position. By pivoting and positioning of the compartment delimiter, a compartment is formed for holding panel-shaped articles of the same shape that are located flat on the base frame or resting on one another.

US 2004/0131441 A1 describes a device for storing and/or for transporting panel-shaped articles, the device comprising a base plate and frame spaced away from it. On the frame, compartment delimiters can be pivoted individually around axes that are aligned parallel to the base plate. The compartment delimiters adjoin one another or are spaced apart from one another by given distances by spacers. By the pivoting of two adjacent compartment delimiters, between them, due to recesses on the compartment delimiters, a compartment is formed for accommodating panel-shaped articles standing vertically on the base plate.

US 2006/0014618 A1 discloses a device for storing and/or for transporting panel-shaped articles, in which there are axes parallel to the base plate in frames projecting from a base plate. Self-clamping compartment delimiters that can be pivoted around the axes are slipped onto the axes with a round cross-section, as a result of which compartments for vertically standing panel-shaped articles are formed between the compartment delimiters.

SUMMARY OF THE INVENTION

The object of the invention is to make available a device of the initially-named type that does not have the disadvantages of the state of the art. In particular, it is to be possible to accommodate panel-shaped articles of different thickness without unwanted forces acting on these panel-shaped articles.

This object is achieved according to the invention with a device and a method as recited in the independent claims appended to this description.

Preferred and advantageous embodiments of the invention are the subject matter of the dependent claims.

It is provided according to the invention that at least parts of compartment delimiters can be moved into an active position in which the parts extend through the support planes and project into the support region, that compartment delimiters with their parts projecting into the support region form compartments for panel-shaped articles in the support region, that compartment delimiters can be moved out of the active position into a readiness position in which compartment delimiters are located outside the support region, that compartment delimiters are arranged in an adjustable manner on positioning strips and that compartment delimiters can be positively and/or non-positively secured on positioning strips against moving.

The parts that are provided on the compartment delimiters according to the invention and that protrude into the support region in the active position of the compartment delimiters can be head regions of the compartment delimiters.

In one embodiment of the invention, the compartment delimiters can be moved along the positioning strips. By the shifting of the compartment delimiters in the longitudinal direction of the positioning strips that are preferably independent of one another, the width of each compartment formed by the compartment delimiters can be chosen independently of the width of other compartments and can be matched to the thickness of a panel-shaped article that is to be accommodated. In the device according to the invention, panel-shaped articles can thus be accommodated without there being larger unused empty spaces in between.

It is preferable if support strips on which panel-shaped articles rest are located in the support planes and the positioning strips are located parallel to the support planes and outside the support region. The support strips on which the panel-shaped articles rest can be cushioned or coated with soft material or can be produced from soft material, in order to prevent edges from being knocked off or scratched or panel-shaped articles from being scratched and to attenuate vibration and impact in the loading and unloading of panel-shaped articles.

Preferably, the device according to the invention has an essentially L-shaped base frame that comprises an essentially horizontal bottom region with a support plane and an essentially vertical support region with another support plane. Panel-shaped articles in this version adjoin the two support planes preferably with their edges. The support plane of the support region is tilted away from vertical. The support plane of the bottom region that includes a right angle with it can be tilted to horizontal. Preferably, the support plane of the bottom region declines toward the support region, and the panel-shaped articles cannot tilt down in the direction of the side of the device opposite the support region.

In one embodiment, the device according to the invention has an essentially A-shaped (comprising two L-shaped base frames arranged mirror-symmetrically) base frame that comprises two essentially horizontal bottom regions with two support planes and two essentially vertical support regions that run onto one another with two further support planes. Preferably, two sides of the A-shaped base frame are provided with the compartment delimiters according to the invention. Within the scope of the invention, it is also taken into account that only one side of an A-shaped base frame is made according to the invention.

If the device according to the invention is intended for transporting panel-shaped articles, in one advantageous embodiment, it can have wheels or rollers on the base frame, in particular on the bottom of the ground region of the base frame, so that the base frame can be moved on the ground or on rails.

In one advantageous embodiment, it is provided that compartment delimiters have a foot region located on the positioning strip assigned to them and a head region that is joined to the foot region, in particular is molded onto it and projects away from the positioning strip, and that can be moved, preferably by pivoting of the foot region around the positioning strip at least with one part through one of the support planes, into and out of the support region.

It is advantageous if head regions have two application surfaces. One head region can preferably be moved into the active position for spacing between two panel-shaped articles and/or for securing (clamping) and/or positioning of the panel-shaped articles through one of the support planes into the support region, at least one application surface in the active position being in contact with a panel-shaped article, in particular being applied to it.

Within the scope of the invention, it is especially preferred if the compartment delimiters, in particular their head regions and application surfaces, do not apply any lateral pressure to the panel-shaped articles held in the compartments, in particular insulating glass elements, if the latter are lying against the panel-shaped articles. Thus, for example, newly-completed insulating glass elements are not exposed to any lateral forces that can lead to deformations, and the sealing mass of the insulating glass elements can cure during storage or during transportation in the device according to the invention.

It is advantageous if compartment delimiters are adjustably located on positioning strips in their longitudinal direction.

It is furthermore advantageous if compartment delimiters can be anchored at a distance from one another on positioning strips, in particular in a self-clamping manner. The spacing of the compartment delimiters from one another can be changed by the compartment delimiters being manually or mechanically released, for example unclamped, and being moved along the positioning strip. In this way, compartments for panel-shaped articles of varied thickness can be formed. It is advantageous if the compartment delimiters cannot be moved out of a locked position or can only be displaced with increased expenditure of force, for example pushed. In this way, unwanted moving of compartment delimiters and tilting of pane-shaped articles are prevented.

It is likewise conceivable within the scope of the invention for the compartment delimiters to be anchored by form-fit at a chosen position on the positioning strip, for example by the positioning strip being a toothed strip and compartment delimiters having elements that fit into the toothed strip.

In one advantageous embodiment of the invention, it is provided that compartment delimiters have foot regions that each comprise two essentially panel-shaped leg elements that are spaced apart from one another with one inner surface and one outer surface each. The inner surfaces face one another and include with one another an (acute) angle. By elastic bending, in this embodiment, the leg elements can be brought close to one another, so that in a released state of the compartment delimiter that has been caused by the compressive force applied to the outer surfaces, in which the angle between the inside surfaces of the leg elements is reduced, a compartment delimiter can be moved along the positioning strip.

Each leg element in one possible embodiment has a hole that is matched in shape and size to the cross-section of the positioning strip, which connects the inner surface and the outer surface and in which the positioning strip is held. In the released state, at a reduced angle, there is (slight) play between the positioning strip and the leg elements, so that the compartment delimiter can be moved (pushed) along the positioning strip. In the anchored state, in which there is too little or no pressure being applied to the outside surfaces of the leg elements, as a result of which the angle between the leg elements is increased, the leg elements with the positioning strip held in the holes cant such that the compartment delimiter is anchored frictionally-locked on the positioning strip by clamping in a certain (preselected) position (i.e., by force fit).

In another embodiment of the invention, the compartment delimiters have foot regions that are made bar-shaped and elliptical in cross-section. A foot region is held between two strips that are parallel to one another and spaced apart from one another. The spacing of the strips from one another is chosen such that it lies between the maximum diameter and the minimum diameter of the elliptical foot region of the compartment delimiter. By turning the compartment delimiter, it can be either fixed (clamped) between the strips or released and then adjusted.

In another embodiment of the invention, the positioning strip is made with an elliptical cross-section. The compartment delimiters are configured in the foot region so that, for example, by their having holes that have an elliptical shape, when pivoted into the support region they are fixed (clamped) in their prepared position and are released when pivoted out of the support region.

In another embodiment of the invention, it is provided that one positioning strip with an elliptical cross-section is made to be rotatable, and the fixing (clamping) and releasing of the compartment delimiters are effected by rotating the positioning strip.

Within the scope of the invention, the positioning strip in cross-section can also be made other than round or elliptical, for example polygonal, square, rectangular, etc.

In one embodiment of the invention, it can be provided that compartment delimiters individually or else jointly, in particular adjacent compartment delimiters, can be moved jointly with at least one part into and out of the support region, in particular by pivoting of compartment delimiters around positioning strips. For this purpose, for example, there can be a mechanism that couples several compartment delimiters to one another, in particular detachably.

In one preferred embodiment of the invention, all compartment delimiters that are required for the positioning of a panel-shaped article are moved at the same time.

It is especially advantageous if the pivoting of compartment delimiters is limited by one of the support strips, and/or by at least one stop, in particular one stop strip, to a predefined and/or an adjustable pivoting range. A stop strip can be located on one support strip or elsewhere on the base frame outside of the support region.

In one especially preferred embodiment of the invention, the compartment delimiters can be made in one piece, in particular cast or punched from one piece. Compartment delimiters according to the invention can likewise be composed of several individual pieces, for example welded or cemented together.

The compartment delimiters are preferably made of plastic or metal.

Within the scope of the invention, it is also taken into account that the compartment delimiters are composed of different components and/or consist of different materials.

It is especially advantageous within the scope of the invention if all compartment delimiters are made and shaped the same. They can, however, also differ from one another in shape and composition.

One embodiment of the invention is especially advantageous in which the compartment delimiters, in particular all compartment delimiters or a group thereof, can be moved into and out of the support region by a drive, in particular by the pivoting of compartment delimiters around positioning strips with parts of the compartment delimiters, in particular with the head region of the compartment delimiters.

It is advantageous if compartment delimiters can be moved along the positioning strip by a drive.

In an automated system, the working sequences can be optimized, and in this way, costs can be cut. In addition, the risk of accident for individuals is reduced.

One embodiment of the invention is preferred in which the positioning strips are assigned one or more operating tool(s) connected to a drive.

It is advantageous if operating tools are components of the device. Operating tools can, however, also be assigned to a separate operating device.

Preferably, operating tools can be moved parallel to the positioning strips assigned to them and can be brought into position on any compartment delimiter.

In one preferred embodiment of the invention, compartment delimiters can be moved by one or more operating tool(s), in particular by at least one part of the compartment delimiters being movable or pivotable by the operating tool(s) into and out of the support region. It is advantageous if the compartment delimiters can be additionally released by the operating tool, can be moved along the positioning strip, and can be anchored (locked) again.

In another embodiment of the invention, the compartment delimiters have elements that can be filled preferably automatically. These elements, for example cushions or balloons, can be enlarged by adding fluid, such as a gas or liquid, and in this way at least partially moved into the support region and can be made smaller by discharging the fluid and in this way moved out of the support region. The fillable element can be the entire head region of the compartment delimiter located on the foot region.

Furthermore, it can be provided according to the invention that fillable elements consist of elastic or inelastic material. Moreover, it can be provided that fillable elements are coated with a substance or plastic of stable or stiff shape.

Another embodiment of the invention calls for the shape, in particular the width, of fillable elements to be supported via elements or coatings of stable or stiff shape, for example rings that can be moved or telescoped into one another or coatings of plastic or natural materials.

Another embodiment of fillable elements according to the invention calls for them to be movable unfilled (or slightly filled) along positioning strips, and after filling (or filling up) to be fixed (locked) on the positioning strips by the enlargement of the elements that accompanies the filling and no longer movable. The fillable elements are enlarged (expanded) preferably only in their height (i.e., in their magnitude that can be measured transversely to the positioning strip) such that a clamping action is achieved, but not in their width.

For example, one embodiment of the invention calls for compartment delimiters to have a foot region that can be slipped onto a positioning strip and a fillable head region. The head region is enlarged after filling with fluid, one or more parts of the fillable head region pressing against the positioning strip and anchoring (locking) the compartment delimiter in its position.

Another embodiment of fillable elements according to the invention calls for fillable elements to be clamped in two-part clamping jaws that are located with a capacity to be routed, especially pushed or moved, for example between positioning strips or support strips. The clamping jaws press (spread) due to the enlargement caused by the filling of the fillable elements against the positioning or support strips and thus anchor the compartment delimiters in their position, for example by locking (by force-fit).

Fillable elements of compartment delimiters can be filled via individual hoses and/or via an external hose system and/or via a pipe system within the device, in particular within positioning strips, by which the fluid, for example a gas, is supplied, for example pumped.

Compartments of different size (width) for panel-shaped articles can be formed by, for example, different levels of filling (for example, inflation) of compartment delimiters, by shifting and subsequently filling (and locking) spacers at a predetermined distance to one another and/or by filling only individual selected spacers.

One method according to the invention calls for the width of the compartments to be set matched to the thickness of the panel-shaped articles.

The width of the compartments can be set at the start of the process or else can be set or changed once or repeatedly during the process.

In one especially preferred embodiment of the method, the compartments for accommodating panel-shaped articles are formed by compartment delimiters, and the width of the compartments is set, preferably at least parts of compartment delimiters being moved into or out of the support region and/or the distance between compartment delimiters being changed, in particular increased or reduced. This adjustment of compartment delimiters can be carried out manually or automatically, in particular using an operating tool and/or by feeding a fluid into fillable elements of compartment delimiters, preferably each compartment delimiter having one fillable element.

In one preferred embodiment, anchored compartment delimiters are first released, then at least parts of these compartment delimiters are moved, and then these compartment delimiters are anchored again.

The method is carried out especially preferably in conjunction with a device according to the invention, but can also be carried out independently thereof with the aid of other devices or tools.

BRIEF DESCRIPTION OF THE DRAWINGS

Other details, features and advantages of the invention will become apparent from the following description with reference to the attached, partially schematic drawings, in which preferred embodiments of the invention are shown by way of example. Here.

DETAILED DESCRIPTION OF THE PREFERRED EMBODIMENTS

Figure 1:
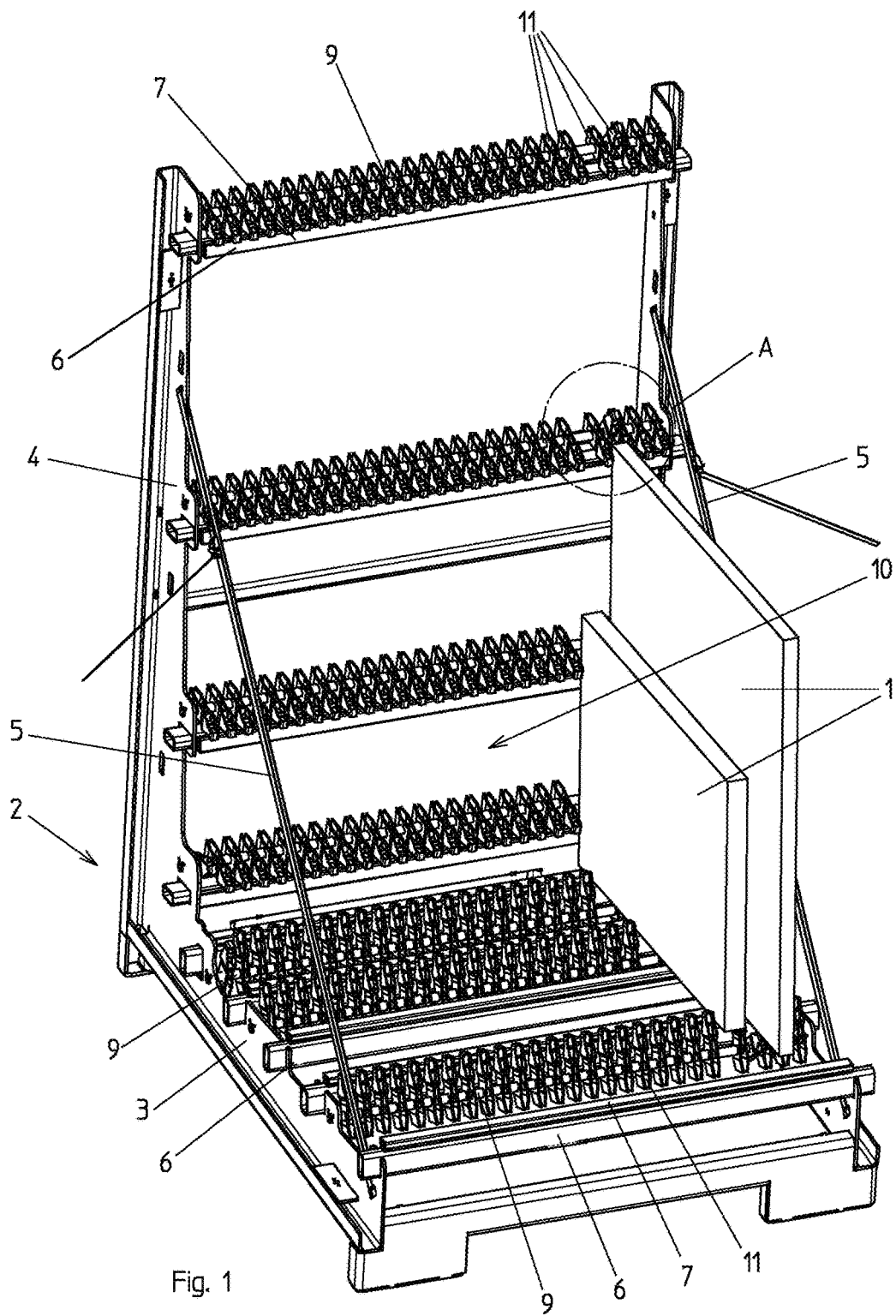
FIG. 1 shows in an isometric view a device with panel-shaped articles.
Figure 2:
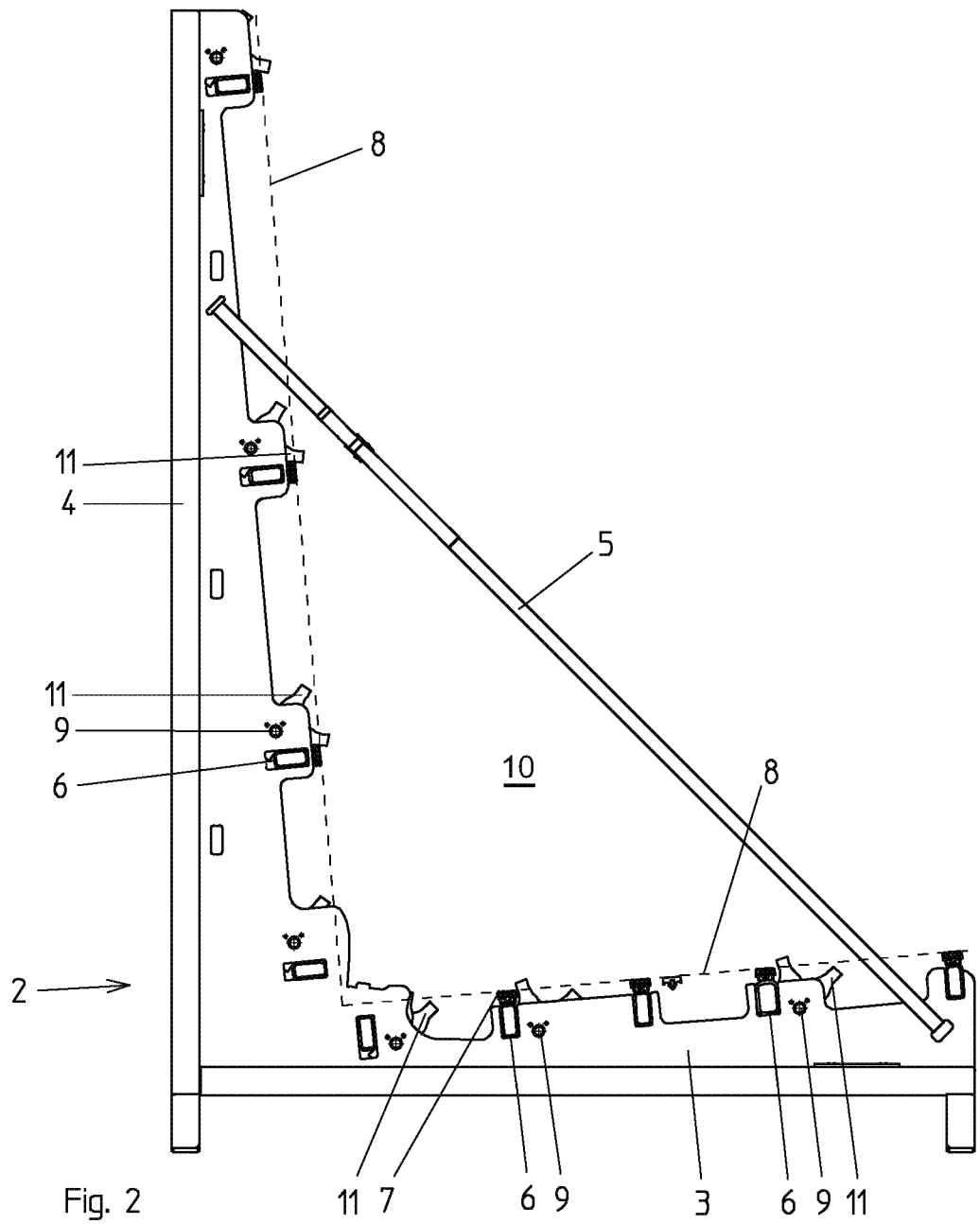
FIG. 2 shows in a side view the device with the support strips added.

FIGS. 1 and 2 show a device according to the invention for storing and/or for transporting vertically standing, panel-shaped articles 1, in particular (newly-sealed) insulating glass elements. The device has an L-shaped base frame 2 comprising a bottom region 3 and a support region 4. Tensioning belts 5 join the bottom region 3 to the support region 4 in order to impart additional stability to the device. The device with the panel-shaped articles 1 stored in it can be moved via rollers or wheels provided on the device, for example on the bottom region 3 of the base frame 2.

In the bottom region 3 and in the support region 4 are support strips 6 that have cushion strips 7 on the side facing the interior (support region 10) of the device. The support strips 6 and the cushion strips 7 located on them form support planes 8 in which panel-shaped articles 1 rest on the cushion strips 7. The support planes 8 jointly border a support region 10.

FIG. 2 shows that the support planes 8 that include a right angle with one another are tilted such that panel-shaped articles 1 cannot tip or slide out of the support region 10 or out of the device in the direction of the side opposite the support region 4.

In the region of the support strips 6 outside of the support region 10 and spaced apart from the support planes 8, there are positioning strips 9. Each positioning strip 9 bears several compartment delimiters 11 that can be pivoted around the positioning strips 9 so that at least one part of each compartment delimiter 11, for example a head region 12 of the compartment delimiters 11, can be moved into the support region 10. In the active position dictated in this way, the compartment delimiters 11 project with parts through the support planes 8 into the support region 10. Compartment delimiters 11 moved into the active position form compartments for panel-shaped articles 1 by parts of the compartment delimiters 11 in the support region 10.

Figure 3:
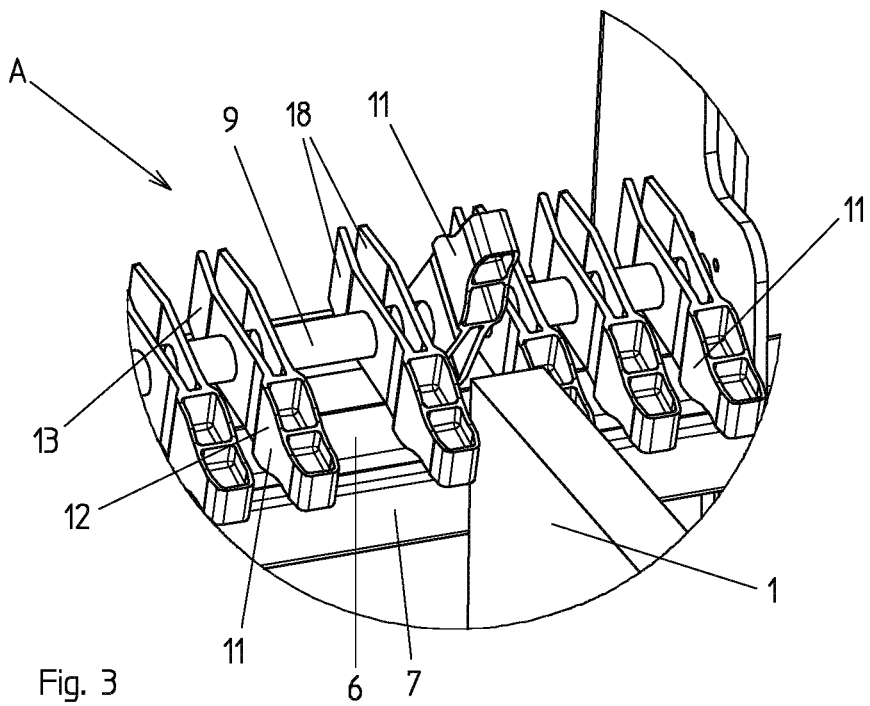
FIG. 3 shows detail A from FIG. 1.
Figure 4:
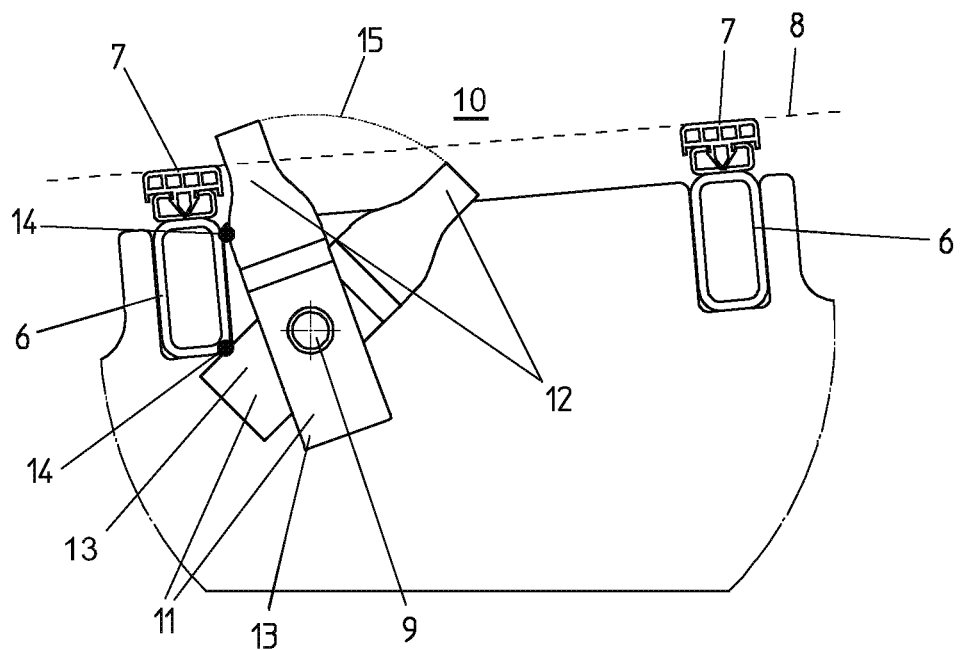
FIG. 4 shows in a side view the pivoting of a compartment delimiter.

FIGS. 3 and 4 show the pivoting of a compartment delimiter 11, once in an isometric view of detail A of FIG. 1 and once in a schematic side view.

FIG. 3 shows that the compartment delimiters 11 can have different distances from one another, so that compartments of different widths can be formed by the compartment delimiters 11. So that there are compartments that correspond to the thickness of a panel-shaped article 1 held in the device, compartment delimiters 11 are displaced along the positioning strips 9 and then are anchored, for example locked, at the corresponding site of the positioning strip 9.

FIG. 3 also shows that individual compartment delimiters 11 can be pivoted out of their active position in order to enable the accommodation of thicker panel-shaped articles 1. This shows that for a completely outfitted device, not all compartment delimiters 11 need be in their active position that forms compartments (and are in contact with panel-shaped articles 1).

A compartment delimiter 11 shown in FIGS. 1 to 5 comprises the head region 12 and a foot region 13 that is joined to the latter, at least one part of the head region 12 being able to be moved by pivoting the compartment delimiter 11 into an active position that extends through the support plane 8 and that projects into the support region 10.

In order to limit the pivoting of the compartment delimiter 11 to a certain pivoting range, there can be stop points 14. FIG. 4 shows one embodiment in which the pivoting of the compartment delimiter 11 is limited by stop points 14. The compartment delimiter 11 in the readiness position with its foot region 13 adjoins a stop point 14 formed by a lower edge of the support strip 6 and in the active position with its head region 12 adjoins a stop point 14 formed by one side surface of the support strip 6. The pivoting of the compartment delimiter 11 between the active position and the readiness position is limited in this way to a pivoting angle 15, for example to 65°.

Figure 5:
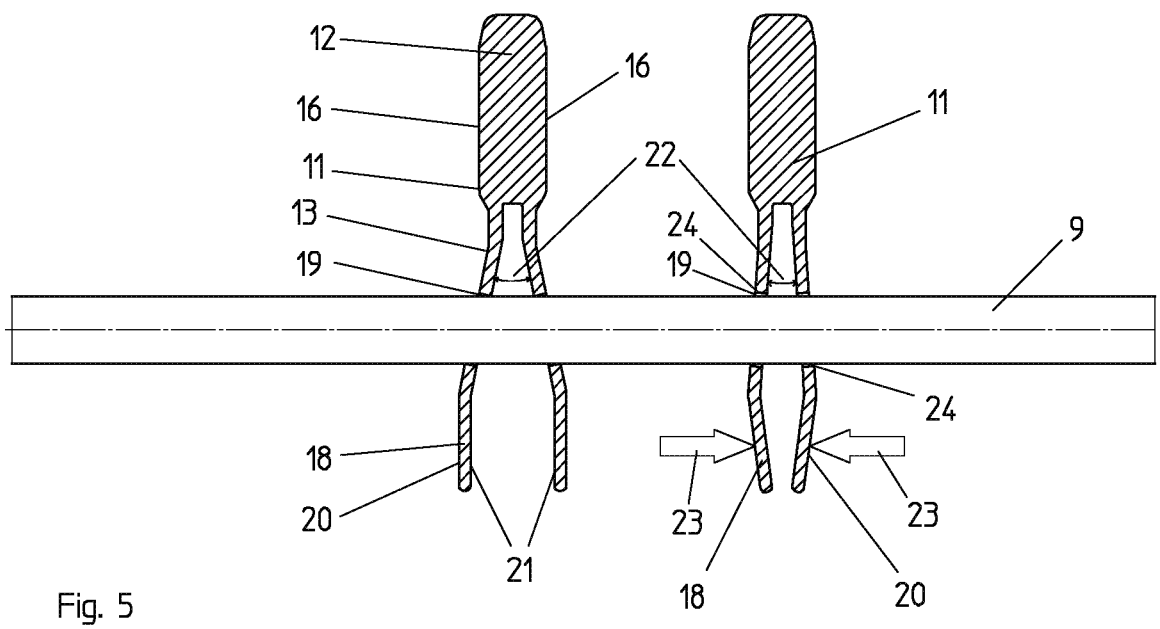
FIG. 5 shows in a section compartment delimiters in the clamped state and in the released state.

FIG. 5 shows a section through two compartment delimiters 11 that are located next to one another. The head region 12 of each compartment delimiter 11 has two application surfaces 16, on which panel-shaped articles 1 can rest. The head region 12 of the compartment delimiter 11 can have two chambers that are not shown, but it also may not have any chambers or fewer or more than two chambers. The chambers can be hollow or can be filled with any material.

The head area 12 of the compartment delimiter 11 adjoins the foot region 13 that comprises two panel-shaped leg elements 18 with one hole 19 each in the exemplary embodiments shown in FIGS. 3 and 5. The leg elements 18 have an outer surface 20 and an inner surface 21 that faces the other leg element 18 of the compartment delimiter 11. The inner surfaces 21 include an angle 22 with one another. The leg elements 18 and/or the compartment delimiters 11 can be elastically bent. Thus, the inner surfaces 21 can be moved onto one another by compressive forces 23 that act on the outer surfaces 20 and that are pointed at the inner surfaces 21, the angle 22 being reduced.

An embodiment is likewise conceivable in which the leg elements 18 run onto one another from the head region 12 in the direction of the end of the foot region 13 and approach one another. In this embodiment, the compressive forces 23 that are acting on the inner surfaces 21 and that are pointed at the outer surface 21 move the inner surfaces 21 away from one another so that an angle included by the inner surfaces 21 is reduced, similarly to the embodiment shown in FIG. 5.

Each hole 19 corresponds in its shape to the cross-sectional shape of the positioning strip 18, but is slightly larger than the cross-sectional area of the positioning strip 9. In the region of the holes 19 at a reduced angle 22, as is shown in the right-hand compartment delimiter 11 in FIG. 5, this yields (slight) play 24 between the leg elements 18 and the positioning strip 9, and the compartment delimiter 11 can be freely shifted along the positioning strip 9, in particular in the longitudinal direction of the positioning strip 9. When the angle 22 is increased, as is shown in the left-hand compartment delimiter 11 in FIG. 5, the positioning strip 9 is locked in the region of the holes 19 of the leg elements 18, as a result of which the compartment delimiter 11 is frictionally locked in its chosen position on the positioning strip 9.

Figure 6:
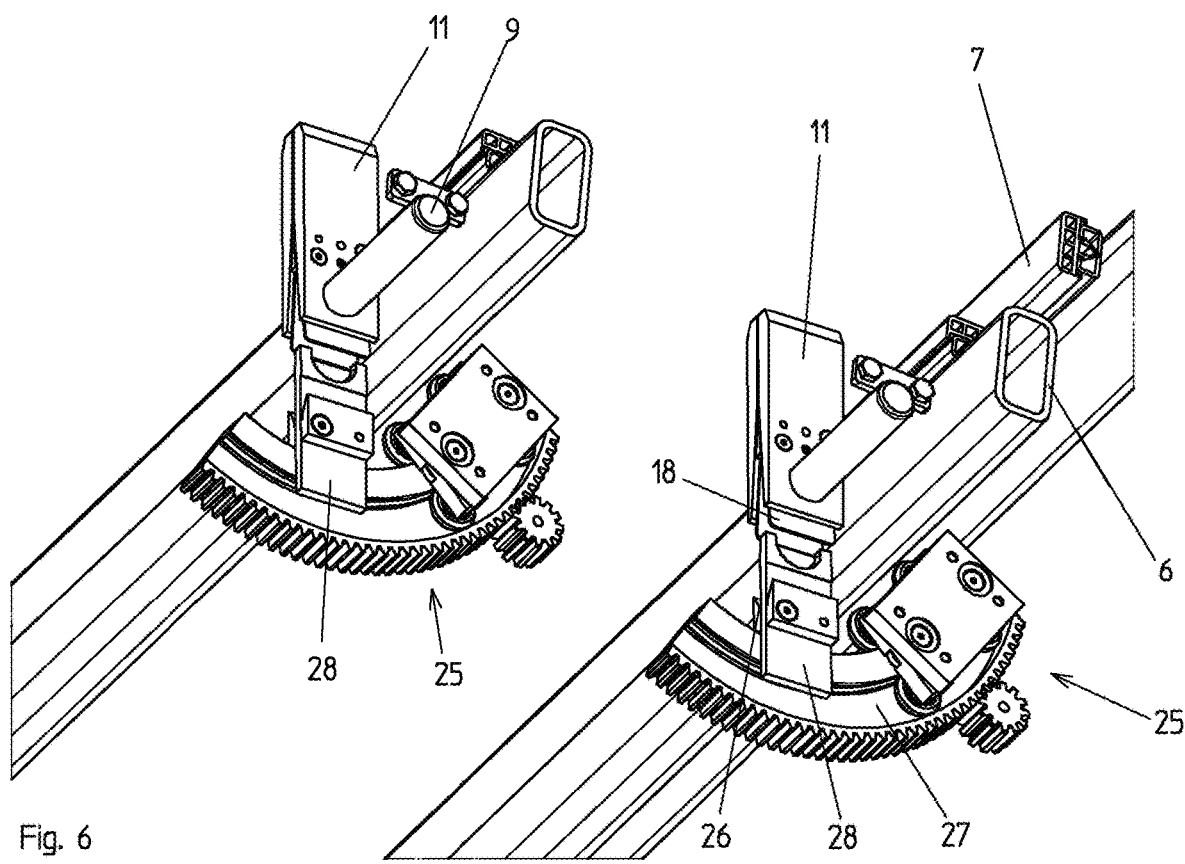
FIG. 6 shows in an isometric view one part of the device with operating tools.

FIG. 6 shows two operating tools 25 that can be positioned along rails that are not shown in the region of (any) compartment delimiters 11. Operating tools 25 can be delivered to a compartment delimiter 11 and brought into active contact with it by a drive that is likewise not shown.

Operating tools 25 have two depressions 26 that taper in a wedge shape. When an operating tool 25 is delivered to a compartment delimiter 11, the leg elements 18 enter the tapering depressions 26, in doing so slide each along an oblique surface of the depression 26, and are moved onto one another, for example by bending, as a result of which the angle 22 between the inner surfaces 21 of the leg elements 18 is reduced. The compartment delimiter 11 is thus released (unlocked) and can be displaced by pushing the operating tool 25 along the rail that runs essentially parallel to the positioning strip 9 along the positioning strip 9. Using a rotating rocker arm 27 that is connected to the operating tool 25, the operating tool 25 can be pivoted, as a result of which the compartment delimiter 11 with which the operating tool 25 is in dynamic contact is pivoted into its active position.

The described processes can also be reversed, so that compartment delimiters 11 can also be pivoted back into their readiness position by the operating tool 25 and/or the operating tool 25 can be removed again from the compartment delimiters 11 by the drive, as a result of which compartment delimiters 11 are clamped again and are anchored at a selected position on the positioning strip 9.

In order to be able to control or hit and/or release and/or to pivot any compartment delimiters 11 of the device, the apparatus according to the invention has sufficiently many operating tools 25, in particular one operating tool 25 for each positioning strip 9.

Embodiments are also conceivable, however, in which there are fewer, for example only one single operating tool 25 or several operating tools 25 as positioning strips 9, the operating tool/tools 25 being movable accordingly in order to be able to be positioned in the region of compartment delimiters 11.

Furthermore, there can also be an external operating device that is not connected to the device on which the operating tool/tools 25 is/are located.

Figure 7A:
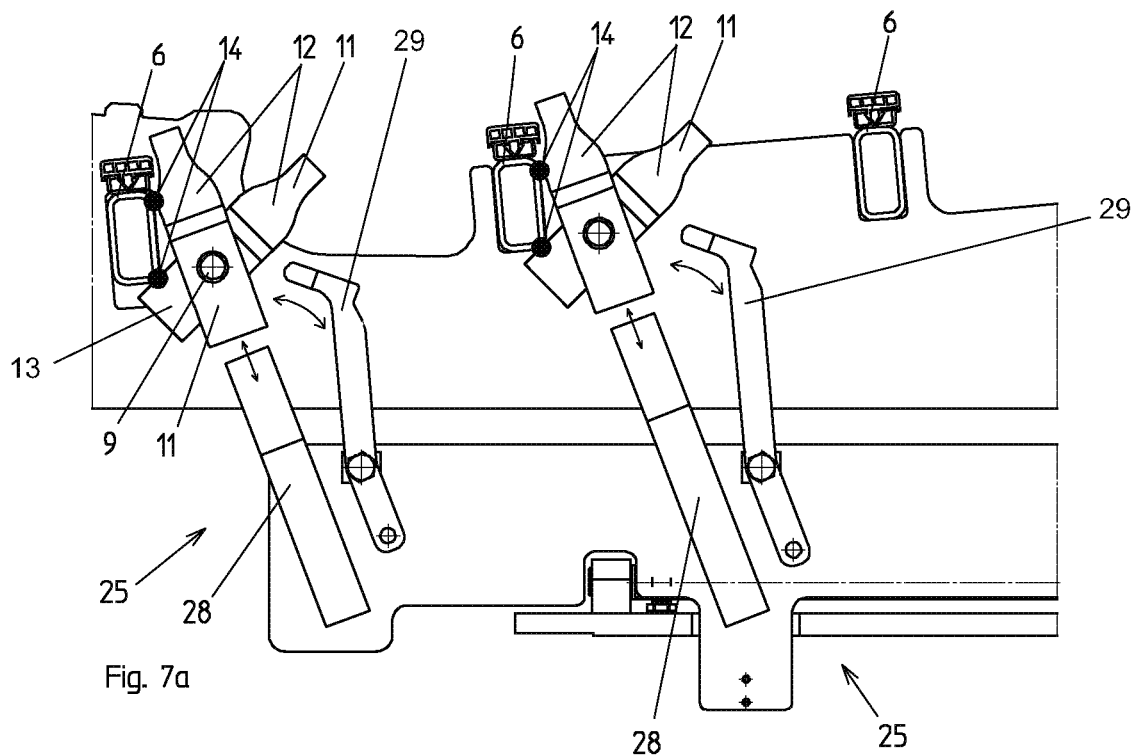
FIG. 7a shows in a side view another embodiment of the operating tool.
Figure 7B:
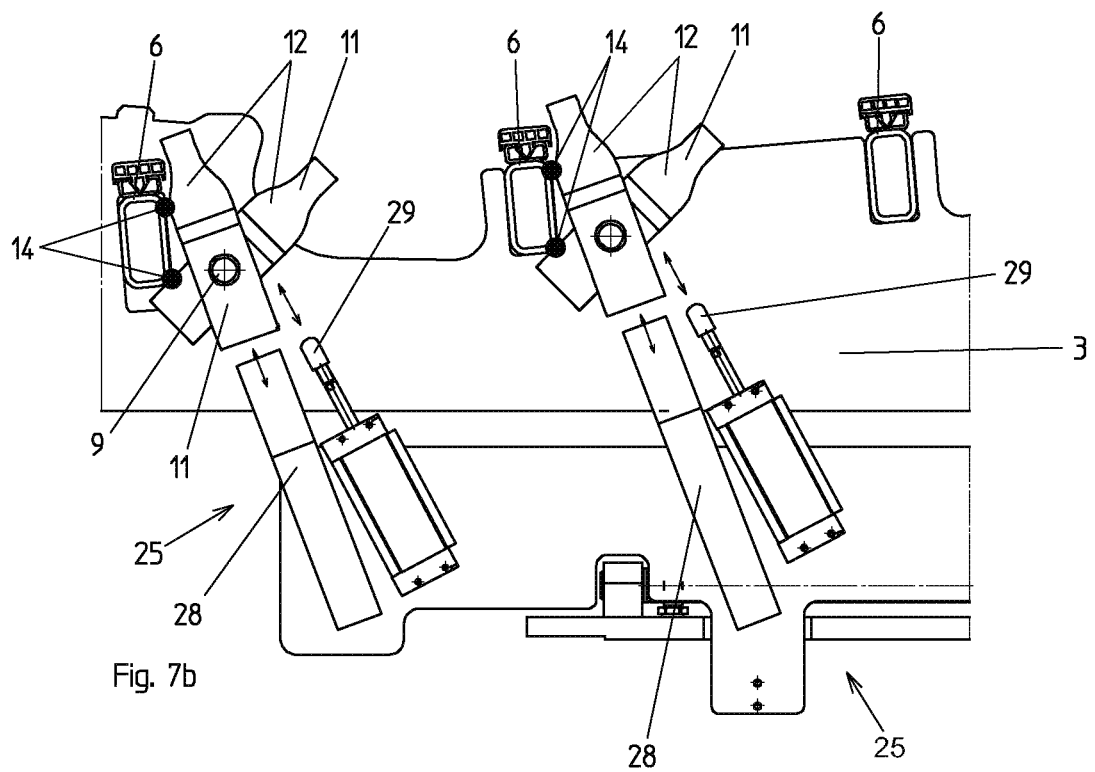
FIG. 7b shows in a side view still another embodiment of the operating tool.

FIGS. 7a and 7b show other preferred embodiments of operating tools 25 according to the invention that can be positioned along a rail that is not detailed in the region of any compartment delimiters 11.

The operating tool 25 according to the invention consists in particular of a release tool 28 and a pivoting tool 29 and can be moved along a rail. The release tool 28 is made such that by hitting or pressing on the foot region 13 of a compartment delimiter 11 in a straight line, it can be released (unlocked) and can be actuated (adjusted) independently of the pivoting tool 29. In one preferred embodiment, the travels of the release tool 28 and/or of the pivoting tool 29 are hydraulically effected. Pneumatic and/or electrical approaches are also possible.

The release tool 28 is made in particular such that after hitting on one compartment delimiter 11, it offers the option of moving the compartment delimiter 11 following the release process along the positioning strip 9 to a selected position.

A sequence of the steps for adjusting a compartment delimiter 11 can be described by way of example as follows:

positioning of the operating tool 25 along the rail in the region of a compartment delimiter 11 that is not in its active position, hydraulic actuation of the pivoting tool 29, pivoting of the compartment delimiter 11 by the travel of the pivoting tool 29, returning the pivoting tool 29 to a rest position, hydraulic actuation of the release tool 28, releasing of the compartment delimiter 11 by the travel of the release tool 28, displacement of the released compartment delimiter 11 using the release tool 28 along the positioning strip 9 to a chosen position.

In the described cycle, individual steps can also be carried out in a different time sequence. For example, it is conceivable within the scope of the invention to first move the compartment delimiter 11 and to pivot it only afterwards. Optionally, individual steps, such as, for example, the displacement of the released compartment delimiter 11, can also be omitted.

The embodiments shown in FIGS. 7a and 7b can also be combined with one another, in particular by an operating tool 25 having the two illustrated forms of the pivoting tool 29.

Figure 8A:
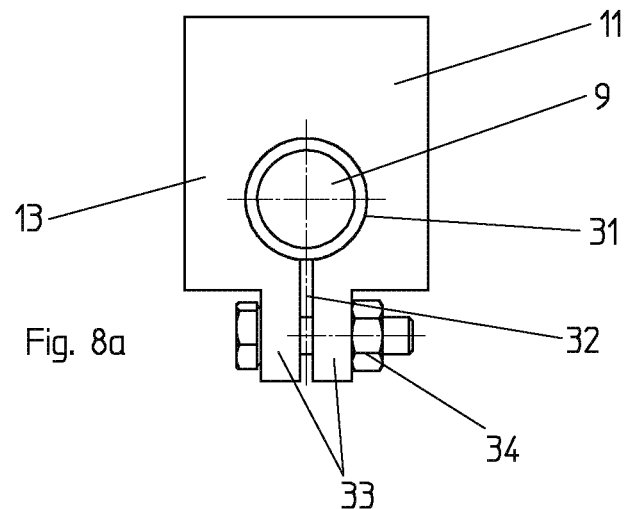
FIG. 8a shows a view of one embodiment for positive anchoring of a compartment delimiter on one positioning strip.

FIG. 8a shows another embodiment of a compartment delimiter 11, in which the foot region 13 with an opening 31 is pushed over a positioning strip 9.

A gap 32 runs away from the opening 31 to the end of the foot region 13, as a result of which the foot region 13 is divided into two component regions 33. The component regions 33 are connected to one another on the end of the foot region 13 via a screw connection 34, the screw of the screw connection 34 being routed through one passage hole at a time in each component region 33 and bridging the gap 32. By tightening the screw connection 34 (for example, by tightening a nut on one end of the screw connection 34), the component regions 33 are bent (elastically) towards one another, and the width of the gap 32 and thus also the opening 31 can be made smaller. A (small) amount of play that is present in a released state between compartment delimiter 11 and positioning strip 9 can be reduced by tightening until no play remains any longer between compartment delimiter 11 and positioning strip 9, and the compartment delimiter 11 can no longer be displaced and thus is frictionally locked. By releasing the screw connection 34, the elastic component regions 33 move away from one another, and the compartment delimiter 11 can be moved again along the positioning strip 9.

Figure 8B:
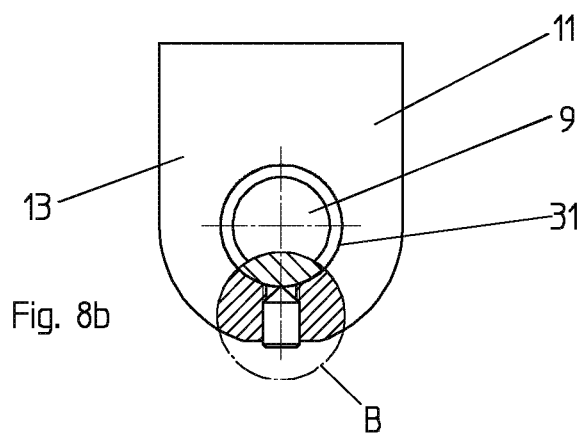
FIG. 8b shows in a sectional view another embodiment for positive anchoring of a compartment delimiter on one positioning strip.
Figure 8C:
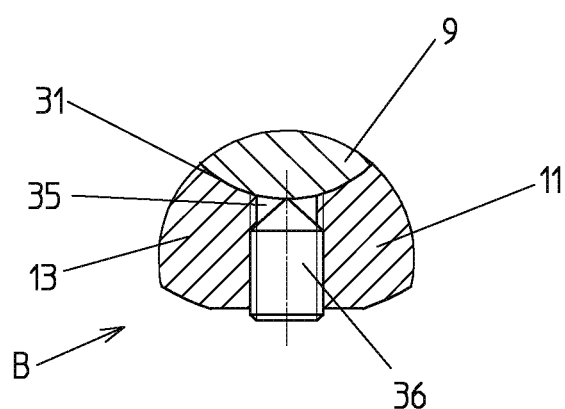
FIG. 8c shows a view of detail B from FIG. 8b.

FIGS. 8b and 8c show another embodiment of a compartment delimiter 11, in which the foot region 13 has likewise been pushed with one opening 31 over a positioning strip 9.

In this embodiment, there is also (little) play between the positioning strip 9 and compartment delimiter 11, so that the compartment delimiter 11 in the released state can be moved along the positioning strip 9 and/or can be pivoted around the positioning strip 9. A headless pin 36 is screwed into a threaded hole 35 that runs from the end of the foot region 13 to the opening 31. If the headless screw 36 is screwed deeply enough into the threaded hole 35, it is forced with one end onto the positioning strip 9, and the compartment delimiter 11 is anchored (locked) at the position that it is just assuming. By screwing the headless pin 36 out of the threaded hole 35, the clamp connection can be released and the compartment delimiter 11 can be moved or turned again.

Figure 9A:
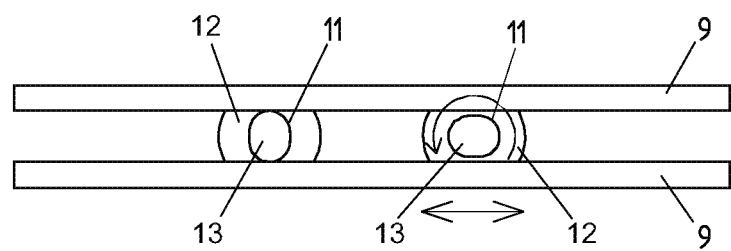
FIG. 9a shows a view of another embodiment for positive anchoring of compartment delimiters between positioning strips.

FIG. 9a shows another embodiment of a compartment delimiter 11, in which a foot region 13 has an elliptical cross-section with a longer major axis and a shorter minor axis.

The foot region 13 is located between two positioning strips 9, the distance between the positioning strips 9 being equal to or (minimally) smaller than the length of the major axis and greater than the length of the minor axis of the elliptical cross-section of the foot region 13.

In a clamped state (FIG. 9a, left), the major axis of the elliptical cross-section of the foot region 13 is located essentially perpendicular to the positioning strip 9, as a result of which the foot region 13 of the compartment delimiter 11 is clamped between the positioning strips 9 and positively locked.

In a released state (FIG. 9a, right), the major axis of the elliptical cross-section of the foot region 13 lies obliquely or essentially parallel to the positioning strips 9, as a result of which the foot region 13 of the compartment delimiter 11 is unlocked, and the compartment delimiter 11 can be moved along the positioning strip 9. Thus, compartment delimiters 11 can delimit compartments of different widths.

By turning the compartment delimiter 11 clockwise or counterclockwise, for example by 90°, the compartment delimiter 11 can be transferred out of the released state into the clamped state and out of the clamped state into the released state.

Figure 9B:
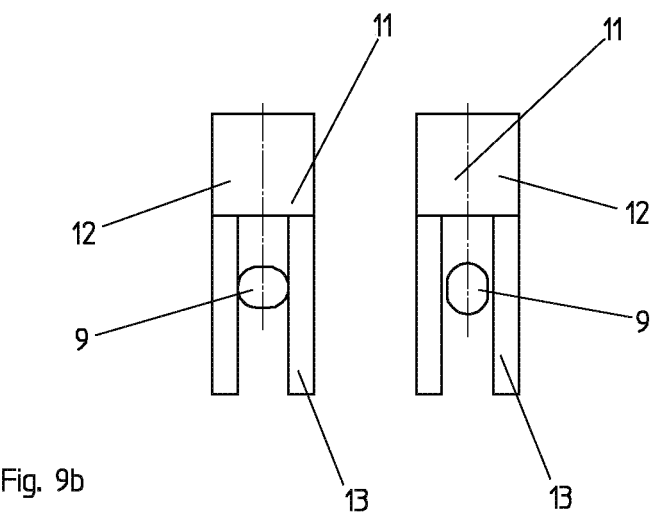
FIG. 9b shows a view of another embodiment for positive anchoring of compartment delimiters with one positioning strip.

FIG. 9b shows another embodiment of a compartment delimiter 11, the foot region 13 having two leg elements 18 that are preferably parallel to one another and that are spaced apart from one another by a leg distance.

Between the leg elements 18, a positioning strip 9 with elliptical cross-section is held, the elliptical cross-section having a longer major axis and a shorter minor axis. The leg distance is equal to or (minimally) smaller than the length of the major axis and greater than the length of the minor axis of the elliptical cross-section of the positioning strip 9.

In the clamped state, the major axis of the positioning strip 9 rests essentially perpendicular on the leg elements 18, as a result of which they can be forced to the outside, and the foot region 13 of the compartment delimiter 11 is anchored laterally on the positioning strip 9 and positively locked.

In the released state, the major axis of the elliptical cross-section of the positioning strip 9 lies essentially obliquely or parallel to the leg elements 18, as a result of which the foot region 13 of the compartment delimiter 11 is unclamped, and the compartment delimiter 11 can be moved along the positioning strip 9.

By turning the positioning strip 9, but also by turning the compartment delimiter 11, for example clockwise or counterclockwise by 90°, the compartment delimiter 11 can be transferred out of the released state into the clamped state and out of the clamped state into the released state.

One embodiment is especially favorable in which head regions 12 of the compartment delimiters 11 in the released state are located outside of the support region 10 and in which compartment delimiters 11 are locked tightly on the positioning strip 9 when the head region 12 is pivoted into the support region 10.

Figure 9C:
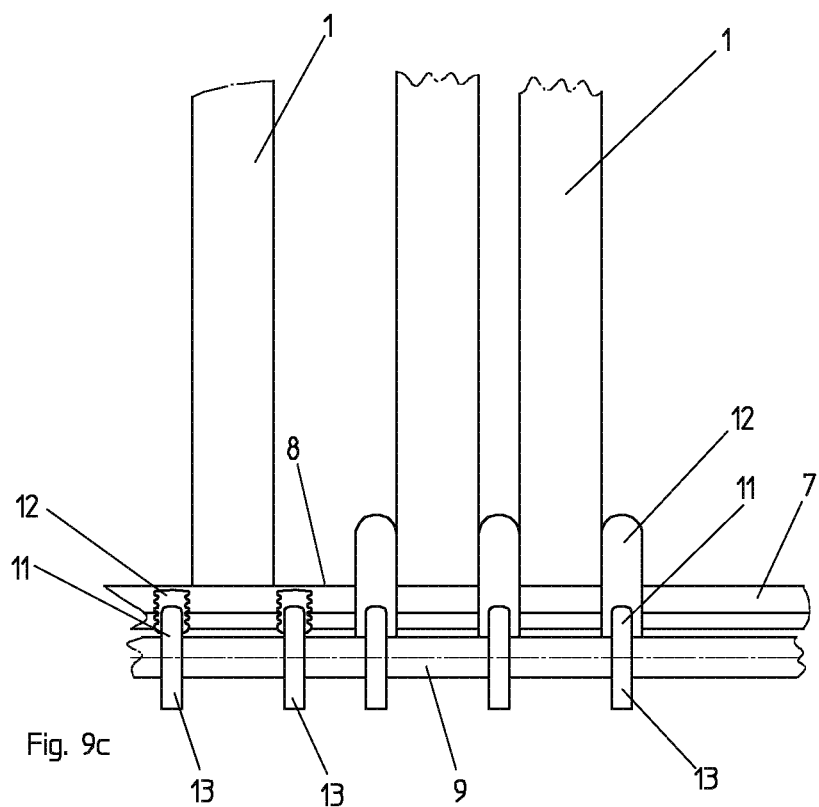
FIG. 9c shows a side view of one section of a device in one alternative embodiment with compartment delimiters that have fillable elements.

FIG. 9c shows one embodiment of the device according to the invention, in which the compartment delimiters 11 have elements that can be filled with a fluid as head regions 12.

In a state in which the fluid is not pressurized, head regions 12 of the compartment delimiters 11 are outside the support region 10, and compartment delimiters 11 can be moved along the positioning strip(s) 9 and can optionally be anchored on the positioning strip(s) 9 in the already-described manner.

By filling the head region 12 of the compartment delimiters 11 that is made as a fillable element with a fluid, for example a gas, or by increasing the pressure in the fluid, head regions 12 expand, project into the support region 10 and delimit compartments. In one preferred embodiment, compartment delimiters 11 lock by filling the head region 12 with fluid or by increasing the pressure in the fluid on the positioning strip 9 or between positioning strips 9 and are in this way positively anchored.

By releasing or exhausting the fluid from the head regions 12 or by relieving the fluid in the head regions 12, they are contracted and are moved out of the support region 10. Optionally, in this way, compartment delimiters 11 are also unclamped, whereupon they are no longer positively anchored on positioning strips 9.

It is in particular preferred if head regions 12 expand essentially only into the support region 10 by filling with fluid and not towards the panel-shaped articles 1. Thus, lateral forces do not act on the panel-shaped articles 1; in the case of newly-completed insulating glass panes, this could lead to unwanted deformations.

The filling of head regions 12 of the compartment delimiters 11 with fluid, its exhaust or the change of pressure in the fluid takes place preferably via a line system that is not shown, especially preferably head regions 12 of the compartment delimiters 11 being able to be filled or emptied independently of one another.

Figure 10A:
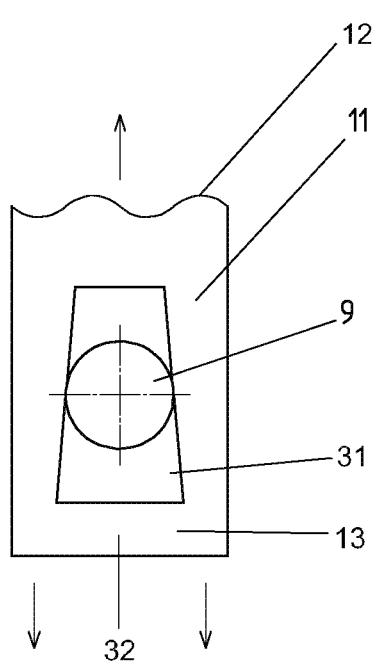
FIG. 10a shows in a sectional view still another embodiment for positive anchoring of a compartment delimiter on a positioning strip.
Figure 10B:
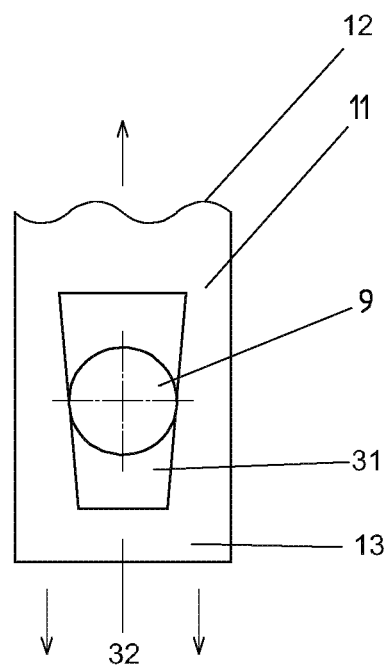
FIG. 10b shows in a sectional view another embodiment for positive anchoring of a compartment delimiter on a positioning strip.

FIGS. 10*a* and 10*b* show two other embodiments of a compartment delimiter 11, in which one foot region 13 at a time with a trapezoidal or triangular opening 31 is pushed over one positioning strip 9.

In FIG. 10*a*, the trapezoidal opening 31 tapers in the direction of the head region 12 of the compartment delimiter 11. The opening 31 is therefore narrower in the vicinity of the head region 12 and wider on the end remote from the head region 12. In the clamped state, the head region 12 of the compartment delimiter 11 is moved towards the positioning strip 9 until the compartment delimiter 11 is locked on the positioning strip 9 that is round in cross-section, and therefore is positively secured. In the released state, the head region 12 of the compartment delimiter 11 is moved away from the positioning strip 9 to such an extent that the compartment delimiter 11 can be moved and/or pivoted freely on the positioning strip.

Anchoring and releasing the embodiment of a compartment delimiter 11 that is shown in FIG. 10*b* works alternatively to the embodiment described in FIG. 10*a*, since the trapezoidal opening 31 shown in FIG. 10*b* widens in the direction to the head region 12 of the compartment delimiter 11.

Within the scope of the invention, it is also taken into account that in the embodiments of the compartment delimiters 11 shown in FIGS. 10*a* and 10*b*, the opening 31 on the end of the foot region 13 remote from the head region 12 is open, and therefore the crosspiece 32 is absent. In this way, the foot region 13 has essentially two leg elements that include with one another an acute angle that runs in the direction of the head region 12 (FIG. 10*a*) or away from the head region 12 (FIG. 10*b*).

In summary, a device according to the invention can be described by way of example as follows:

A device for storing and/or for transporting preferably essentially vertically aligned panel-shaped articles 1, in particular insulating glass elements, with support planes 8 and with compartment delimiters 11 that delimit compartments, the support planes 8 bordering a support region 10. At least parts of compartment delimiters 11 can be moved into an active position, in which parts extend through the support planes 8 and project into the support region 10, so that compartment delimiters 11 with their parts projecting into the support region 10 form compartments for panel-shaped articles 1 in the support region 10. Compartment delimiters 11 can be moved out of the active position into a readiness position in which compartment delimiters 11 are located outside of the support region 10. Compartment delimiters 11 are located adjustably on positioning strips 9, and compartment delimiters 11 can be anchored by form-fit and/or force fit against movement on positioning strips 9.

The invention claimed is:

1. A device for storing and/or for transporting panel-shaped articles (1), comprising:
    a base frame (2), with a bottom region (3) extending in a first direction and a support region (4) extending from said bottom region (3) in a second direction different from said first direction,
    said bottom region (3) and said support region (4) each comprising support strips (6), the support strips (6) of the base frame (2) defining a first support plane (8) and the support strips (6) of the support region (4) defining a second support plane (8) that intersects with said first support plane (8), the first and second support planes (8) together delimiting a support region (10),
    each of the bottom region (3) and the support region (4) of the base frame (2) comprising positioning strips (9) that extend in a third direction normal to said first and second directions,
    each one of said positioning strips (9) having compartment delimiters (11) mounted thereon, at least two compartment delimiters (11) of said compartment delimiters (11) being movable between an active position, in which at least a part of the compartment delimiters (11) extends through one of the support planes (8) and projects into the support region (10), and a readiness position, in which the part is entirely outside of the support region (10)
    said parts of the at least two compartment delimiters (11), projecting into the support region (10) in the active position, forming compartments for the panel-shaped articles (1) in the support region (10),
    said compartment delimiters (11) being mounted adjustably on the positioning strips (9), each compartment delimiter (11) comprising an anchoring mechanism operable to alternately anchor the compartment delimiter (11) at a position along a length of a positioning strip (9) on which the compartment delimiter (11) is mounted and free the compartment delimiter for displacement along the length of the positioning strip (9); and
    an operating tool (25) connected to a drive and operable to move along a direction parallel to a length direction of a positioning strip (9) of said positioning strips (9) assigned thereto, the operating tool configured to be moved, in operation, into a position of a compartment delimiter (11) mounted on said assigned positioning strip to be actuated, and thereby to actuate the compartment delimiter to be actuated by moving the compartment delimiter alternately between the active position and the readiness position.

2. The device according to claim 1, wherein the anchoring mechanism of the compartment delimiters (11) anchors the compartment delimiters (11) on the positioning strips (9) by clamping.

3. The device according to claim 1, wherein compartment delimiters (11) in the readiness position are positioned so as to be spaced apart from the support planes (8).

4. The device according to claim 1, wherein the positioning strips (9) extend in a direction parallel to the support planes (8) and are located outside the support region (10).

5. The device according to claim 1, wherein the base frame (2) is essentially L-shaped, the bottom region (3) being essentially horizontal, and the support region (4) being essentially vertical.

6. The device according to claim 1, wherein each of the compartment delimiters (11) has a foot region (13) that is located on a positioning strip (9) of the positioning strips (9), and a head region (12) that is joined to the foot region (13) and is spaced apart from the positioning strip (9), each of the compartment delimiters (11) configured to pivot at the foot region (13) for movement of the head region into and out of the support region (10).

7. The device according to claim 6, wherein each head region (12) has at least one application surface (16) to accommodate the panel-shaped articles (1).

8. The device according to claim 6,
wherein each of the foot regions (13) comprise two leg elements (18) that are spaced essentially apart from one another, each with one inner surface (21) and one outer surface (20), the inner surfaces (21) of the two leg elements (18) facing one another and, in a clamped state of the compartment delimiter (11), having an angle (22) with one another, and
wherein the leg elements (18) are elastically bendable, and
wherein in a released state of the compartment delimiters (11), while a compressive force (23) is applied to the outer surfaces (20) or the inner surfaces (21), the angle (22) between the inner surfaces (21) is reduced.

9. The device according to claim 8,
wherein the leg elements (18) each have a hole (19) with a same shape and size as a cross-section of the positioning strip (9) and that connects the inner surface (21) and the outer surface (20) of the leg elements (18), the positioning strip (9) extending through the hole (19),
wherein in the released state at a reduced angle (22) between the positioning strip (9) and leg element (18), there is play (24) in the region of the hole (19) such that a compartment delimiter (11) in the release state is movable along the positioning strip (9), and
wherein in the clamped state at an increased angle (22), the positioning strip (9) cants in the region of the hole (19) with the leg element (18), and the compartment delimiter (11) is clamped on the positioning strip (9).

10. The device according to claim 1, wherein head regions of adjacent compartment delimiters (11) are movable jointly into and out of the support region (10) by pivoting of the adjacent compartment delimiters (11).

11. The device according to claim 4, wherein a pivoting movement of the compartment delimiters (11) is limited to a pivoting range by any of the support strips (6) and/or a stop strip.

12. The device according to claim 1, wherein the compartment delimiters (11) are made in one piece.

13. The device according to claim 1, wherein the compartment delimiters (11) are movable into and out of the active position using a drive.

14. The device according to claim 1, wherein the compartment delimiters (11) are displaceable along the positioning strip (9) using a drive.

15. The device according to claim 1, wherein the compartment delimiters (11) can be freed, displaced and anchored by the operating tool (25).

16. The device according to claim 1, wherein the at least two compartment delimiters (11) include a fillable element that enlarges by adding fluid thereto so that at least the part of the compartment delimiters extend into the support region (10), and discharging the fluid removes the fillable element from the support region (10).

17. The device according to claim 16, wherein the compartment delimiters (11) become clamped upon the positioning strips (9) by filling the fillable element.

18. A method for storing and/or for transporting of panel-shaped articles (1), comprising:
using at least one operating tool to perform at least one of a first adjustment to one or more compartment delimiters and a second adjustment to the one or more compartment delimiters, the first adjustment causing the one or more compartment delimiters to pivot and cause a part of the one or more compartment delimiters to alternately extend into or move out from a support region of a device that accommodates a panel-shaped article (1), and the second adjustment causing the one or more compartment delimiters to move along a length of a positioning strip on which the one or more compartment delimiters are mounted; and
accommodating the panel-shaped article (1) in a compartment formed in the support region (10) of the device, a width of the compartment adjusted by said at least one of first adjustment and second adjustment to match a thickness of the panel-shaped article (1),
wherein the width of the compartment is set by at least one of movement of the parts of the compartment delimiters (11) alternately into and out of the support region (10) and changing a distance between compartment delimiters (11), and
wherein the operating tool (25) carries out the second adjustment upon a compartment delimiter by releasing the compartment delimiter, moving the compartment delimiter along the length of the positioning strip on which the compartment delimiter is mounted, and then anchoring the compartment delimiter upon the positioning strip.

19. A method for storing and/or for transporting of panel-shaped articles (1), comprising:
performing at least one of a first adjustment to one or more compartment delimiters and a second adjustment to the one or more compartment delimiters, the first adjustment causing the one or more compartment delimiters to cause a part of the one or more compartment delimiters to alternately extend into and move out from a support region of a device that accommodates a panel-shaped article (1), and the second adjustment causing the one or more compartment delimiters to move along a length of a positioning strip on which the one or more compartment delimiters are mounted; and
accommodating the panel-shaped article (1) in a compartment formed in the support region (10) of the device, a width of the compartment adjusted by said at least one of first adjustment and second adjustment to match a thickness of the panel-shaped article (1),
wherein the width of the compartment is set by at least one of movement of the parts of the compartment delimiters (11) alternately into and out of the support region (10) and changing a distance between compartment delimiters (11), and
wherein the first adjustment upon a compartment delimiter comprises adding fluid to a fillable element of the compartment delimiter to extend the fillable element into the support region (10) or alternately discharging the fluid to remove the fillable element of the compartment delimiter from the support region (10).

\* \* \* \* \*